United States Patent
Römer et al.

(10) Patent No.: US 11,359,637 B2
(45) Date of Patent: Jun. 14, 2022

(54) VALVE FLAP DEVICE FOR A BYPASS VALVE OF A TURBOCHARGER

(71) Applicant: Vitesco Technologies GMBH, Hannover (DE)

(72) Inventors: Christian Römer, Kleinniedesheim (DE); Christian Kirschner, Neulußheim (DE)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 16/844,546

(22) Filed: Apr. 9, 2020

(65) Prior Publication Data
US 2020/0232472 A1 Jul. 23, 2020

Related U.S. Application Data

(63) Continuation of application No. PCT/EP2018/074711, filed on Sep. 13, 2018.

(30) Foreign Application Priority Data

Oct. 12, 2017 (DE) ...................... 10 2017 218 297.0

(51) Int. Cl.
*F04D 27/02* (2006.01)
*F02B 37/16* (2006.01)
(Continued)

(52) U.S. Cl.
CPC .......... *F04D 27/0215* (2013.01); *F02B 37/16* (2013.01); *F04D 17/10* (2013.01); *F16K 3/06* (2013.01)

(58) Field of Classification Search
CPC ...... F04D 27/0215; F04D 17/10; F02B 37/16; F02B 37/186; F02B 37/183; F16K 3/06
(Continued)

(56) References Cited

U.S. PATENT DOCUMENTS 9,127,590 B2 * 9/2015 Schoenherr ........... F02B 37/183
9,464,565 B2 * 10/2016 Yamaguchi ............... F02C 6/12
(Continued)

FOREIGN PATENT DOCUMENTS

CN 204610021 U 9/2015
CN 105715362 A 6/2016
(Continued)

OTHER PUBLICATIONS

International Search Report and Written Opinion dated Nov. 26, 2018 from corresponding International Patent Application No. PCT/EP2018/074711.
(Continued)

*Primary Examiner* — J. Todd Newton

(57) ABSTRACT

A valve flap device for opening and closing a bypass valve of a turbocharger is provided. The valve flap device includes a valve spindle, a flap support arranged on the valve spindle and having a through aperture, a cover disk in the form of a circular ring, and a valve flap arranged on a support lower side of the flap support on the support lower side. The valve flap includes a flap plate and a flap support pin arranged on the flap plate rear side and is passed through the through aperture of the flap support and is firmly connected to the cover disk. A spring element is installed in the spring gap under a preload. A centering device, provided on the support upper side, is arranged concentrically with the central axis of the through aperture and keeps the spring element in a centered position relative to the central axis.

9 Claims, 6 Drawing Sheets

(51) Int. Cl.
*F04D 17/10* (2006.01)
*F16K 3/06* (2006.01)

(58) Field of Classification Search
USPC .......................................................... 415/144
See application file for complete search history.

(56) References Cited

U.S. PATENT DOCUMENTS

| | | | | |
|---|---|---|---|---|
| 9,593,624 B2* | 3/2017 | Segawa | ................ | F02B 37/186 |
| 9,618,038 B2* | 4/2017 | Dilalan | ................... | F16C 33/08 |
| 9,631,628 B2* | 4/2017 | Takahashi | ............. | F02B 37/183 |
| 9,664,064 B2* | 5/2017 | Stilgenbauer | ........... | F02B 37/24 |
| 9,869,238 B2* | 1/2018 | Stilgenbauer | ......... | F02B 37/183 |
| 9,874,139 B2* | 1/2018 | Marques | ............... | F02B 37/183 |
| 10,119,549 B2* | 11/2018 | Tschirschke | .......... | F04D 29/403 |
| 10,125,672 B2* | 11/2018 | Goeckelmann | ........... | F16K 1/36 |
| 10,215,089 B2* | 2/2019 | Uneura | .................. | F02B 37/183 |
| 10,302,010 B2* | 5/2019 | Diemer | ................ | F16K 15/028 |
| 10,487,725 B2* | 11/2019 | Takahashi | ............. | F02B 37/186 |
| 10,570,815 B2* | 2/2020 | Gong | .................... | F02B 37/183 |
| 10,619,560 B2* | 4/2020 | Igarashi | ................ | F01D 17/105 |
| 10,787,957 B2* | 9/2020 | Nakajima | ............. | F02B 37/186 |
| 10,920,660 B2* | 2/2021 | Schawer | ................ | F02B 37/186 |
| 10,968,819 B2* | 4/2021 | Jaenike | ................. | F02B 37/186 |
| 2002/0078934 A1* | 6/2002 | Hohkita | ................... | F02B 37/16 |
| | | | | 123/564 |
| 2012/0055154 A1* | 3/2012 | Ebert | .................... | F02B 37/186 |
| | | | | 60/602 |
| 2014/0345273 A1* | 11/2014 | Yamaguchi | ............... | F02C 6/12 |
| | | | | 60/602 |
| 2014/0366530 A1* | 12/2014 | Murayama | ............ | F02B 37/183 |
| | | | | 60/602 |
| 2015/0147162 A1* | 5/2015 | Stilgenbauer | ......... | F02B 37/183 |
| | | | | 415/145 |
| 2015/0377119 A1* | 12/2015 | Niedens | ................ | F02B 37/186 |
| | | | | 74/579 E |
| 2016/0053675 A1* | 2/2016 | Mehne | .................. | F02B 37/186 |
| | | | | 251/279 |
| 2016/0178028 A1* | 6/2016 | Lummer | ............... | F02B 37/186 |
| | | | | 251/321 |
| 2016/0341112 A1* | 11/2016 | Goeckelmann | ....... | F16K 15/028 |
| 2016/0348574 A1* | 12/2016 | Goeckelmann | ......... | F16K 51/00 |
| 2017/0145909 A1* | 5/2017 | Huh | ........................ | F02B 37/18 |
| 2017/0248071 A1* | 8/2017 | Diemer | ................... | F16K 31/44 |
| 2018/0298831 A1* | 10/2018 | Rott | ........................ | F02B 37/16 |
| 2019/0003376 A1* | 1/2019 | Schawer | ................ | F16C 27/02 |
| 2019/0003377 A1* | 1/2019 | Jaenike | ................. | F02B 37/186 |

FOREIGN PATENT DOCUMENTS

| | | |
|---|---|---|
| CN | 106168160 A | 11/2016 |
| CN | 106257014 A | 12/2016 |
| CN | 106574549 A | 4/2017 |
| DE | 102011076361 A1 | 11/2012 |
| DE | 102012216893 A1 | 4/2014 |
| DE | 7305670 U | 2/2015 |
| DE | 112013002861 T5 | 2/2015 |
| DE | 102016002269 A1 | 8/2017 |
| EP | 2798172 A1 | 11/2014 |
| JP | 2016205252 A | 12/2016 |
| JP | 2017020712 A | 1/2017 |
| WO | 2013022598 A1 | 2/2013 |
| WO | 2017157769 A1 | 9/2017 |

OTHER PUBLICATIONS

German Search Report dated Aug. 2, 2018 for corresponding German Patent Application No. 10 2017 218 297.0.
Chinese Office Action dated May 8, 2021 for corresponding Chinese Patent Application No. 201880066417.4.

* cited by examiner

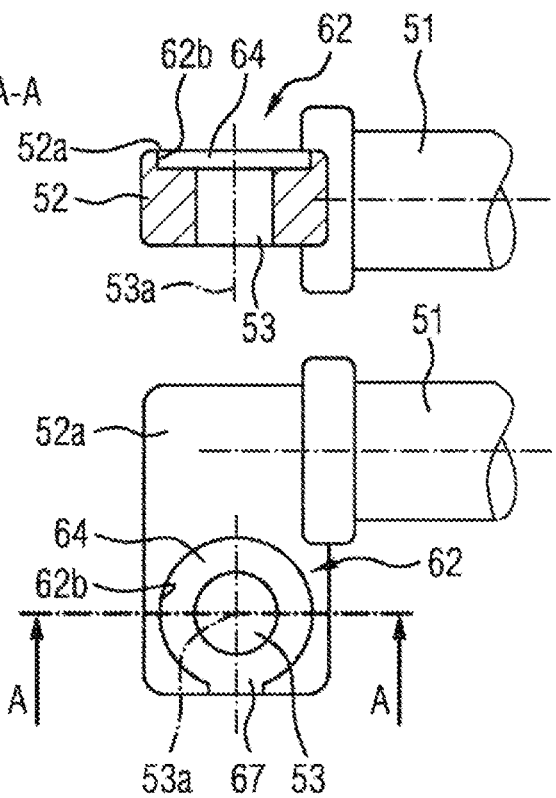
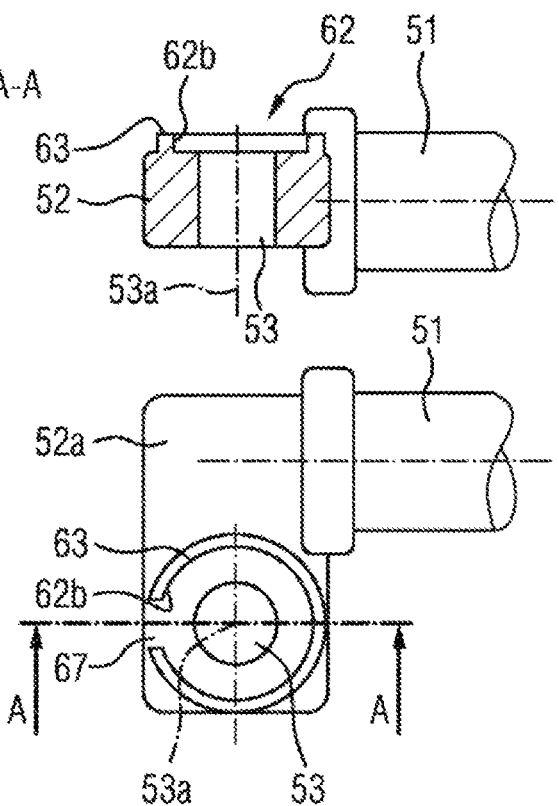

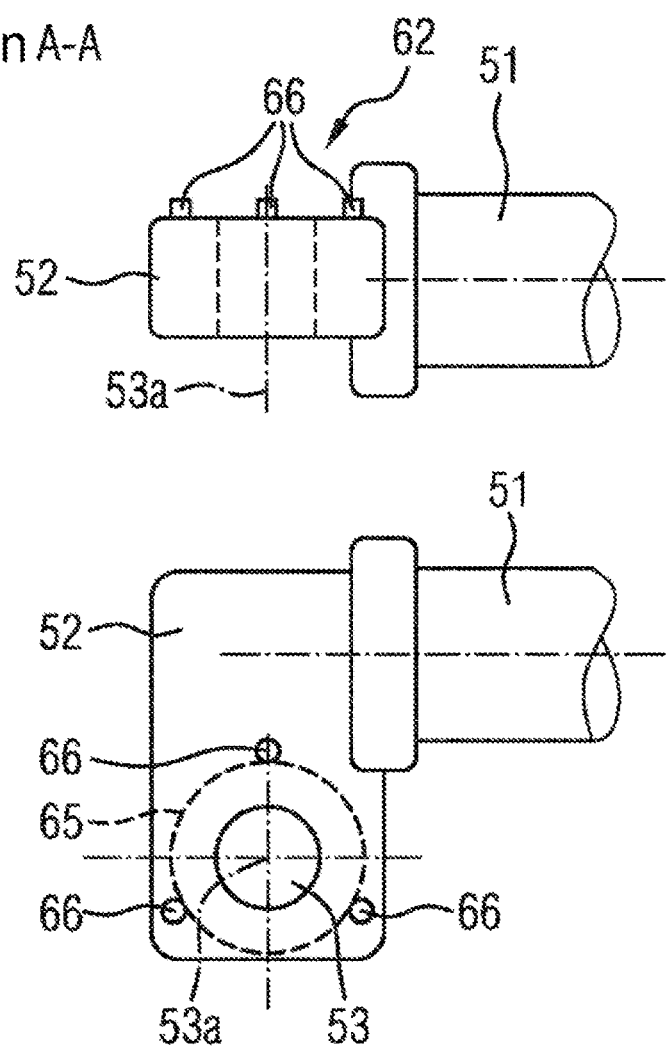

VALVE FLAP DEVICE FOR A BYPASS VALVE OF A TURBOCHARGER

CROSS-REFERENCE TO RELATED APPLICATIONS

This application claims priority to PCT Application PCT/EP2018/074711, filed Sep. 13, 2018, which claims priority to German Patent Application No. DE 10 2017 218 297.0, filed Oct. 12, 2017. The disclosures of the above applications are incorporated herein by reference.

FIELD OF THE INVENTION

The invention relates to a valve flap device for opening and closing a bypass valve, such as a wastegate valve in an exhaust-gas turbine, or an overrun air recirculation valve in a radial compressor, of a turbocharger. The invention furthermore relates to a turbocharger having an abovementioned valve flap device for an internal combustion engine.

BACKGROUND OF THE INVENTION

Turbochargers are increasingly being used to increase power in motor vehicle internal combustion engines. More and more frequently, this is being done with the aim of reducing the overall size and weight of the internal combustion engine for the same power or even increased power and, at the same time, of reducing fuel consumption and thus $CO_2$ emissions, in view of ever stricter legal requirements in this respect. The principle of action consists in using the energy contained in the exhaust-gas flow to increase a pressure in an intake tract of the internal combustion engine and thus to bring about better filling of a combustion chamber of the internal combustion engine with atmospheric oxygen. In this way, more fuel, such as gasoline or diesel, is converted in each combustion process, that is to say the power of the internal combustion engine may be increased.

To this end, the turbocharger has an exhaust-gas turbine arranged in the exhaust tract of the internal combustion engine, a radial compressor arranged in the intake tract, and a rotor bearing arranged in between. The exhaust-gas turbine has a turbine housing and a turbine impeller arranged therein, which is driven by the exhaust-gas mass flow. The radial compressor has a compressor housing and a compressor impeller arranged therein, which builds up a boost pressure. The turbine impeller and the compressor impeller are arranged rotationally conjointly on the opposite ends of a common shaft, referred to as the rotor shaft, and thus form what is referred to as the turbocharger rotor. The rotor shaft extends axially between the turbine impeller and compressor impeller through the rotor bearing arranged between the exhaust-gas turbine and fresh-air compressor, and is rotatably mounted in the rotor bearing in the radial and axial directions in relation to the rotor shaft axis. According to this construction, the turbine impeller driven by the exhaust-gas mass flow drives the compressor impeller via the rotor shaft, thereby increasing the pressure in the intake tract of the internal combustion engine behind the radial compressor in relation to the fresh air mass flow, and thereby ensuring better filling of the combustion chamber of each cylinder of an internal combustion engine with atmospheric oxygen.

In turbochargers, the speed and power of the turbine are frequently regulated in that a bypass valve for the exhaust-gas mass flow, referred to as a wastegate valve, which is arranged in the turbine housing, is opened and closed in a regulated manner in order to conduct a part of the exhaust gas past the turbine via a wastegate duct. This bypass valve typically has a valve flap device.

To stabilize the operation of the radial compressor, especially in transient operating situations, particularly to prevent the harmful "compressor surge", a bypass valve for fresh-air mass flow, referred to as an overrun air recirculation valve, arranged in the compressor housing is often used, by which excess fresh air that has already been compressed is fed back from the compressor outlet into the inlet region of the compressor. A bypass valve of this kind may also have a corresponding valve flap device.

Corresponding valve flap devices often have a multi-part construction, consisting of: a valve spindle, which is mounted in the respective housing (compressor housing/turbine housing) so as to be rotatable about its spindle axis and is operatively connected to an actuator on the outside of the respective housing for the actuation of the valve flap device; a lever or crank element, referred to below as a flap support, arranged on the valve spindle in the interior of the housing, and a valve flap, which is arranged on the flap support and rests in a sealing manner on the respective valve seat in the closed state of the bypass valve.

Owing to component tolerances, thermal expansion and deformation during operation at high temperatures and high closing forces, axial and radial clearances are required between the flap support and the valve flap in order to be able to ensure leaktight closure of the respective bypass valve during operation.

However, the clearance which is required, on the one hand, leads, on the other hand, to unwanted noise development and increased wear due to possible relative movements between the flap support and the valve flap when subject to excitation by the possibly pulsating fluid flow, especially in the open state of the bypass valve.

In order to avoid these disadvantages, different approaches to a solution are already known in the prior art.

Thus, DE 11 2013 002 861 T5, for example, discloses a flap assembly which has a pivotable flap lever, a flap plate, connected to the flap lever, for opening and closing a wastegate duct, and a spring element, wherein the spring element is arranged between the flap lever and a disk secured on the flap plate and has an outer circumferential region which is supported on a sliding contact surface of curved design on the flap lever.

EP 2 798 172 B1 also discloses a flap device for a wastegate valve, in which a damping element is arranged between an operating lever, on which the valve flap is arranged by a valve stem, and a support plate, which is connected to the valve stem of the valve flap.

With these known solutions, it has been found that the centered positioning of the spring or damping element represents a problem area which may lead to deviations in position and unwanted jamming effects between the valve flap and the lever arm.

To counteract this problem, DE 10 2012 216 893 A1 discloses a flap valve with a spindle that has a spindle arm and with a flap plate, which is arranged on the spindle arm and has a stud that passes through an opening formed in the spindle arm, wherein the stud interacts on the side of the spindle arm facing away from the flap plate with a holding disk in order to hold the flap plate. Arranged between the spindle arm and the holding disk is a Belleville spring, which, on its outer edge, has at least one bent-up tab for centering the Belleville spring relative to the stud of the flap plate. However, such tabs on the Belleville spring have proven to be a source of faults owing to the high temperatures and loads during operation.

SUMMARY OF THE INVENTION

One object underlying the invention is thus to indicate an alternative concept for a flap device of a turbocharger which allows efficient sealing of the wastegate duct, avoids the abovementioned disadvantages or weaknesses and, at the same time, ensures particularly low-noise and low-wear operation.

According to the invention, a valve flap device for opening and closing a bypass valve of a turbocharger is disclosed. The valve flap device has a valve spindle for rotatable mounting of the valve flap device in the housing or in a housing wall of the turbocharger, having a flap support arranged on the valve spindle. The flap support, in turn, has a support upper side and a support lower side and a through aperture, e.g. a circular through hole, which extends through the flap support from the support lower side to the support upper side and has a central axis. Moreover, the valve flap device has a cover disk, which has an outer circumference and a central through aperture, e.g. likewise a circular through hole, and is arranged on the support upper side concentrically with the through aperture thereof. The cover disk is preferably in the form of a circular ring and has a circular outer circumference with an outer diameter.

On the support lower side of the flap support, a valve flap having a flap plate and a flap support pin is arranged in such a way on the flap plate rear side facing the flap support that the flap support pin is passed from the support lower side through the through aperture of the flap support and through the central aperture of the cover disk and is firmly connected to the cover disk. In this case, the circumferential geometry of the flap support pin is matched to the through hole in the flap support, for example, and has a pin central axis which, when the flap support pin is in a centered position in the through aperture of the flap support, corresponds or coincides with the central axis thereof. Sufficient clearance is preferably provided between the flap support pin of the valve flap and the through aperture of the flap support to enable the flap plate to be aligned on the valve seat during the closure of the bypass valve.

In this case, a spring gap, in which a spring element acting in the axial direction of the central axis of the through aperture or the pin central axis is installed under a preload, is provided between the support upper side and the cover disk.

The valve flap element is characterized in that the spring element extends radially at least as far as the outer circumference of the cover disk or projects beyond the outer circumference of the cover disk at least in some region or regions, and in that a centering device, which is arranged concentrically with the central axis of the through aperture and outside the outer circumference of the cover disk and thus outside the spring gap, and which forms a radial stop for the spring element and keeps the spring element in a centered position relative to the central axis, is provided on the support upper side.

In this case, the spring element is preferably designed in such a way that it rests against the centering device, i.e. against the radial stop, by the regions which project on its outside as far as the outer circumference or beyond the outer circumference of the cover disk. The arrangement of the centering device outside the outer circumference of the cover disk or outside the spring gap enables the full travel of the spring element to be used.

The advantages of the invention may be regarded as the fact that efficient sealing of the wastegate duct is made possible without having to accept the disadvantages of noise generation and increased wear. At the same time, the operational reliability and longevity of the system is increased.

By its very nature, the turbocharger according to the invention for an internal combustion engine has an exhaust-gas turbine and a radial compressor. In this case, a valve flap device according to the invention, and in accordance with one of the exemplary embodiments described above or below, is used in a bypass valve designed as a wastegate valve of the exhaust-gas turbine or in a bypass valve designed as an overrun air recirculation valve of the radial compressor. This includes the possibility that both the wastegate valve and the overrun air recirculation valve of the turbocharger may also be designed in accordance with the bypass valve according to the invention.

A selection of exemplary embodiments of the invention and various possible combinations of features of various embodiments are explained in greater detail below with reference to the illustrations in the drawing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

In the Figures:

FIG. 5 shows a segment of a valve spindle with a flap support for a valve flap device in two views, substantially in accordance with the exemplary embodiment from FIG. 3;

FIG. 6 shows a segment of a valve spindle with a flap support for a valve flap device in two views, in accordance with another exemplary embodiment of the invention;

FIG. 7 shows a segment of a valve spindle with a flap support for a valve flap device in two views, in accordance with another exemplary embodiment of the invention;

DETAILED DESCRIPTION OF THE PREFERRED EMBODIMENTS

The following description of the preferred embodiment(s) is merely exemplary in nature and is in no way intended to limit the invention, its application, or uses.

Parts which are identical in terms of function and designation are denoted by the same reference signs throughout the Figures.

Figure 1:
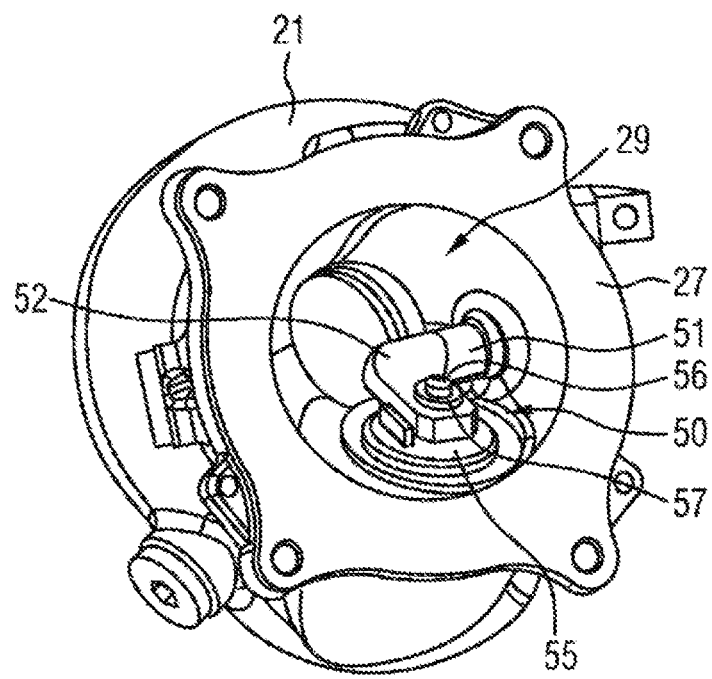
FIG. 1 shows a turbine housing of a turbocharger having a wastegate valve in accordance with the prior art.

FIG. 1 shows a bypass valve of the type in question having a valve flap device 50 in accordance with the known prior art, using as an example a wastegate valve 29 in a turbine housing 21 of a turbocharger 1. The view into the turbine housing 21 is from the side of the exhaust pipe connection flange 27 onto the closed wastegate valve. Here it is possible to see the valve spindle 51 mounted in the housing wall of the turbine housing 21, the flap support 52 arranged on the valve spindle 51, the flap plate 55 of the valve flap arranged on the flap support 52, and the cover disk 57, which is arranged on the upper side of the flap support 52 and is firmly connected to the flap support pin 56 and thus fixes the valve flap on the flap support.

Figure 2:
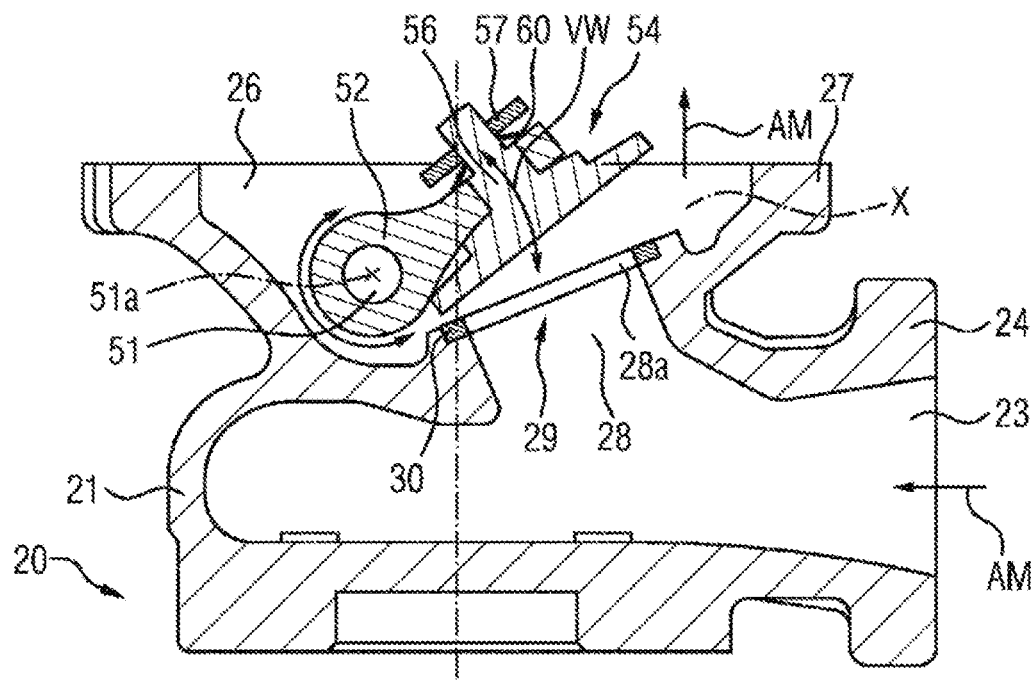
FIG. 2 shows a schematically simplified sectional view of a wastegate valve having a valve flap device in accordance with the prior art.

FIG. 2 shows another illustration of a bypass valve having a valve flap device 50, once again using a wastegate valve 29 as an example, in accordance with the prior art. Here, the schematically simplified sectional illustration shows all the essential parts of a bypass valve of this kind.

The exhaust-gas mass flow AM enters the turbine housing 21 of the exhaust-gas turbine 20 (only indicated here) via the exhaust-gas feed duct 23. In the turbine housing 21, the exhaust-gas mass flow AM is conducted to the turbine wheel (not illustrated) and then emerges through the exhaust-gas discharge duct 26 into the exhaust-gas system (not illustrated) and through the latter into the surroundings. The bypass duct 28, in this case a wastegate duct, now directly connects the exhaust-gas feed duct 23 to the exhaust-gas discharge duct 26. The bypass duct 28 has a flat valve seat 28a. To close the bypass duct 28, the valve flap 54 is placed in a sealing manner by its flap plate 55 on the valve seat 28a. The valve flap 54 is fastened to a flap support 52, which is mounted on a valve spindle 51 and which is thus mounted so as to be rotatable about the valve spindle axis of rotation 51a. Because of rotation of the valve spindle 51, together with the flap support 52, about the valve spindle axis of rotation 51a (clockwise in the drawing), the valve flap 54 is set down onto the valve seat 28a from an approximately perpendicular direction along the valve flap path VW, and the bypass duct 28 is thus closed and, in the reverse direction, opened.

The flap support pin 56 of the valve flap 54 is passed through the flap support 52 and the cover disk 57 from the side facing the flap plate 55 and is firmly connected, e.g. welded or riveted, to the cover disk 57. A spring element 60 designed as a Belleville spring, which is installed under preload in the axial direction of the flap support pin 56 and thus holds the valve flap 54 in position, is arranged between the cover disk 57 and the upper side of the flap support 52.

Figure 3:
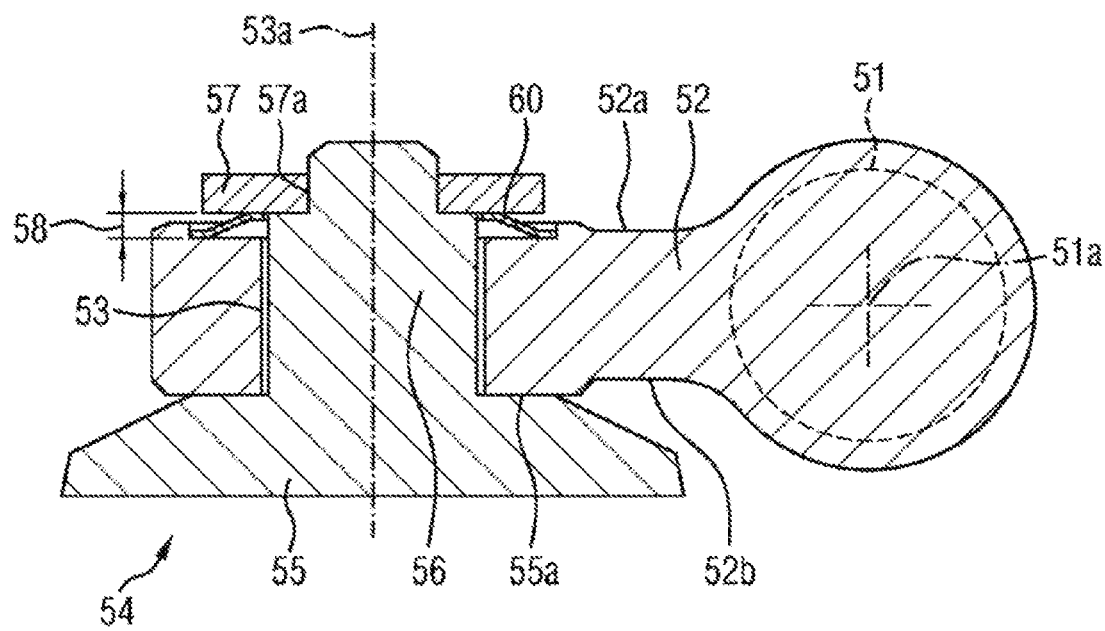
FIG. 3 shows a schematically simplified sectional view of a valve flap device according to an exemplary embodiment of the invention.

FIG. 3 then shows an exemplary embodiment according to the invention of a valve flap device 50 in a schematically simplified sectional illustration. The valve flap device has a valve spindle 51 having a valve spindle axis of rotation 51a, for rotatable mounting of the valve flap device 50 in the housing wall of the turbocharger 1. Arranged on the valve spindle 51 is a flap support 52, having a support upper side 52a and a support lower side 52b as well as a through aperture 53. The through aperture 53 extends through the flap support 52 from the support lower side 52b to the support upper side 52a and has a central axis 53a.

A cover disk 57, which is in the form of a circular ring, for example, and has an outer circumference, such as an outer diameter, and a central through aperture 57a, is arranged on the support upper side 52a concentrically with the through aperture 53 thereof.

A valve flap 54 is arranged on the flap support 52 on the support lower side 52b. The valve flap 54 has a flap plate 55 and a flap support pin 56, which is arranged on the flap plate rear side 55a facing the flap support 52. The flap support pin 56 is passed from the support lower side 52b through the through aperture 53 of the flap support 52 and through the central aperture 57a of the cover disk 57 and is firmly connected to the cover disk 57, e.g. by a welded joint or a riveted joint.

A spring gap 58, in which a spring element 60 acting in the axial direction of the central axis 53a of the through aperture 53 is installed under a preload, is provided between the support upper side 52a and the cover disk 57. This is indicated on an enlarged scale in FIG. 4 for greater clarity of illustration.

Figure 4:
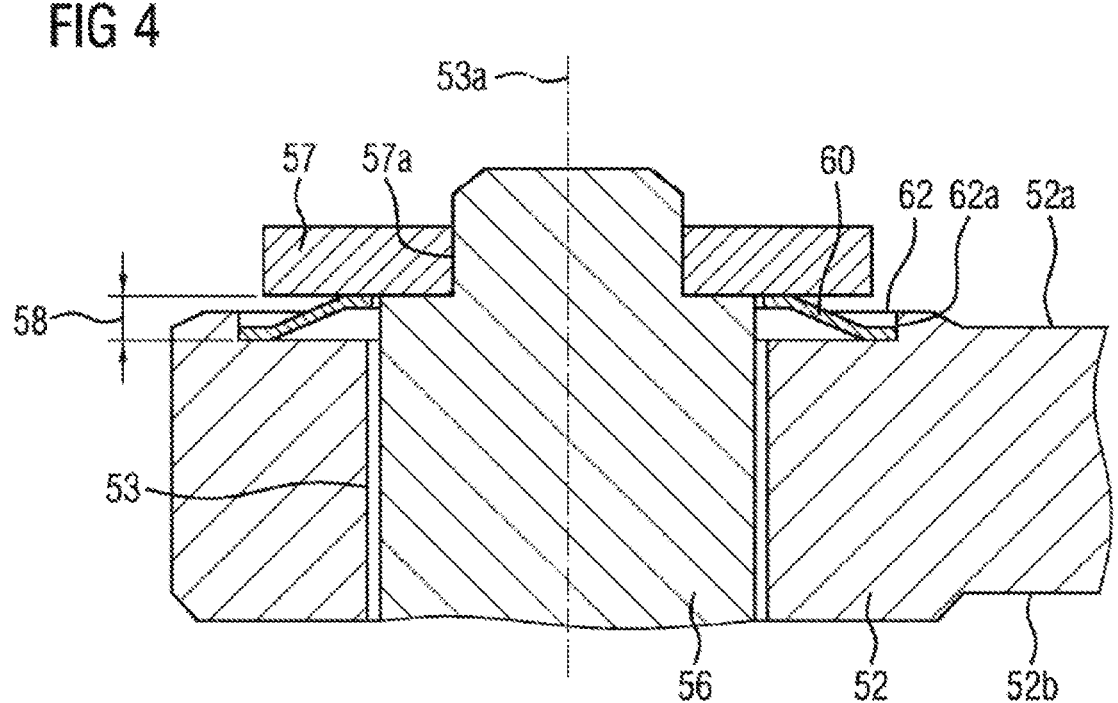
FIG. 4 shows an enlarged partial segment of FIG. 3 to provide a clearer illustration of the arrangement of the spring element.

It is clearly apparent in FIG. 4 that, in relation to a line perpendicular to the central axis 53a of the through aperture 53, the spring element 60 extends radially at least as far as the outer circumference of the cover disk or projects beyond the outer circumference of the cover disk 57 at least in some region or regions, and that a centering device 62, which is arranged concentrically with the central axis 53a of the through aperture 53 and outside the outer circumference of the cover disk 57, that is to say outside the spring gap 58, and which forms a radial stop 62a for the spring element 60 and keeps the spring element 60 in a centered position relative to the central axis 53a, is provided on the support upper side 52a. By virtue of the fact that the spring element 60 projects beyond the outer circumference of the cover disk 57 at least in some region or regions and that the centering device 62 is arranged outside the outer circumference of the cover disk 57, the spring element 60 may be compressed over its entire spring travel.

It is furthermore apparent in FIG. 4 that, in an advantageous embodiment of the valve flap device 50, the spring element 60 is in the form of a Belleville spring which, in the region of the outer edge thereof, rests on the support upper side 52a and against the centering device 50, and also against an inner edge 62b of a depression 64, which is arranged in the surface of the support upper side 52a, or of a web 63, which is raised relative to the surface of the support upper side 52a.

FIGS. 5 to 7 each show a segment of a valve spindle 51 with the flap support 52 arranged thereon for a respective embodiment of a valve flap device according to the invention, in each case in two different views. The upper illustration in the respective Figure shows the flap support 52 in a front view, while the respective lower illustration shows it in plan view. In this case, the objects shown differ essentially in the different embodiment of the centering device 62 arranged on the support upper side 52a.

FIG. 5 shows a valve spindle 51 with the flap support 52 arranged thereon for a valve flap device according to the invention, wherein the centering device 62 is formed by an inner edge 62b of a depression 64, which is arranged in the surface of the support upper side 52a, and is formed so as to run concentrically around the central axis 53a, at least over partial sections of the circumference. This embodiment corresponds substantially to the embodiment that is also illustrated in FIGS. 3 and 4.

FIG. 6 shows a valve spindle 51 with the flap support 52 arranged thereon, for another valve flap device according to the invention, wherein the centering device 62 is formed by an inner edge 62b of a web 63, which is raised relative to the surface of the support upper side 52a, and is formed so as to run concentrically around the central axis 53a, at least over partial sections of the circumference. In this case, it is also possible for a plurality of web sections which are arranged separately and at a distance from one another and are distributed over the circumference to be provided.

FIG. 7 shows a valve spindle 51 with the flap support 52 arranged thereon, for another valve flap device according to the invention, wherein the centering device 62 is formed by at least three individual centering pins 66, which are arranged in a manner distributed along a circle circumference 65 and are raised relative to the surface of the support upper side 52a, wherein the circle circumference 65 is arranged concentrically with the central axis 53a. These centering pins each likewise form a radial stop for the spring element 60 by their respective flanks facing the spring element 60. Only 3 centering pins 66 are illustrated in FIG. 7 but, of course, it is also possible for more centering pins to be arranged in a manner distributed along the circle circumference 65.

Figure 8:
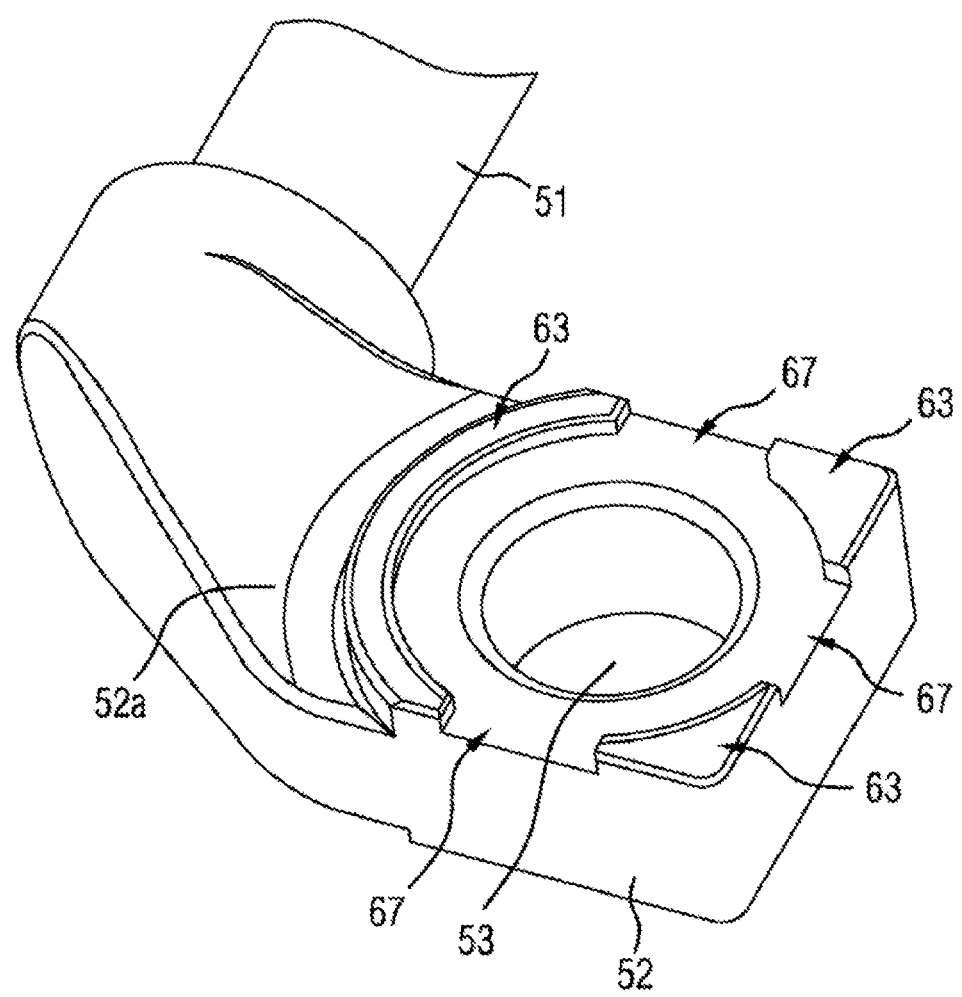
FIG. 8 shows a three-dimensional view of part of a valve spindle with a flap support for a valve flap device, substantially in accordance with the exemplary embodiment from FIG. 5.

FIG. 8 shows a valve spindle 51 with the flap support 52 arranged thereon, for another valve flap device according to the invention, in a three-dimensional view, wherein, as in FIG. 6, the centering device 62 is formed by a web 63, which is raised relative to the surface of the support upper side 52a, and is formed so as to run concentrically around the central axis 53a, at least over partial sections of the circumference. In this case, it is seen in FIG. 8 that the centering device 62, i.e. the web 63, has at least one recess 67, which extends over a partial section of the circumference and opens up the view to the spring element 60, even in the fully assembled state of the valve flap device. This makes it possible, during assembly for example, to carry out a quality check to ensure the completeness of the subassembly, to ensure the presence of the spring element, by visual inspection. Moreover, such recesses 67 for visual checking of the spring element 60 are also illustrated in FIGS. 5 and 6.

Figure 9:
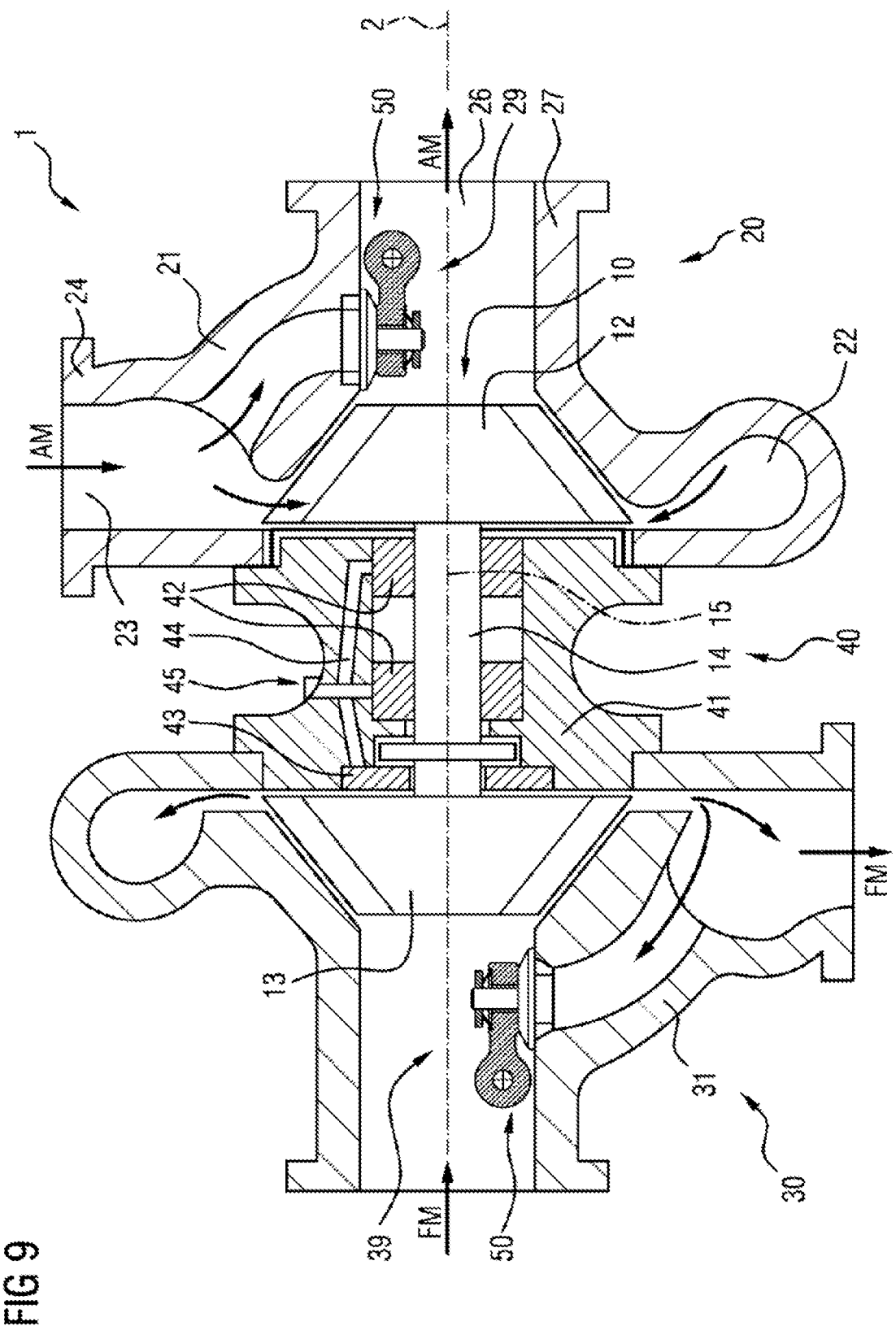
FIG. 9 shows a schematically simplified sectional illustration of a turbocharger in accordance with an embodiment according to the invention.

FIG. 9 shows, in schematically simplified form, an exemplary embodiment of a turbocharger 1 according to the invention in sectional illustration. The turbocharger 1 includes an exhaust-gas turbine 20, a radial compressor 30 and a rotor bearing 40. The exhaust-gas turbine 20 is equipped with a wastegate valve 29, having a valve flap device 50 according to the invention, and an exhaust-gas mass flow AM is indicated by arrows. The radial compressor 30 has an overrun air recirculation valve 39 with a valve flap device 50 according to the invention, and a fresh-air mass flow FM is likewise indicated by arrows. A turbocharger rotor 10, as it is known, of the turbocharger 1 has a turbine impeller 12 (also referred to as turbine wheel), a compressor impeller 13 (also referred to as compressor wheel) and a rotor shaft 14 (also referred to as shaft). The turbocharger rotor 10 rotates about a rotor axis of rotation 15 of the rotor shaft 14 during operation. The rotor axis of rotation 15 and at the same time the turbocharger axis 2 (also referred to as longitudinal axis of the turbocharger) are illustrated by the indicated centerline and identify the axial orientation of the turbocharger 1. The turbocharger rotor 10 is supported with its rotor shaft 14 by two radial bearings 42 and one axial bearing disk 43. Both the radial bearings 42 and the axial bearing disk 43 are supplied with lubricant via oil supply channels 44 of an oil connection 45.

In general, a conventional turbocharger 1, as illustrated in FIG. 9, has a multi-part construction. Here, a turbine housing 21, which is arrangeable in the exhaust tract of the internal combustion engine, a compressor housing 31, which is arrangeable in the intake tract of the internal combustion engine, and a bearing housing 41 between the turbine housing 21 and compressor housing 31 are arranged in series with respect to the common turbocharger axis 2 and are connected to one another in terms of assembly. A further structural unit of the turbocharger 1 is represented by the turbocharger rotor 10, which has the rotor shaft 14, the turbine impeller 12, which is arranged in the turbine housing 21, and the compressor impeller 13, which is arranged in the compressor housing 31. The turbine impeller 12 and the compressor impeller 13 are arranged on the opposite ends of the common rotor shaft 14 and connected rotationally conjointly thereto. The rotor shaft 14 extends in the direction of the turbocharger axis 2 axially through the bearing housing 41 and is mounted in the axial and radial directions therein so as to be rotatable about its longitudinal axis, the rotor axis of rotation 15, wherein the rotor axis of rotation 15 lies on the turbocharger axis 2, that is to say coincides therewith.

Here, the turbine housing 21 has an exhaust-gas annular duct, referred to as an exhaust-gas channel 22, that is arranged annularly around the turbocharger axis 2 and the turbine impeller 12 and narrow in a volute shape toward the turbine impeller 12. This exhaust-gas channel 22 has an exhaust-gas feed duct 23, directed tangentially outward, with a manifold connection branch 24 for connecting to an exhaust-gas manifold (not illustrated) of an internal combustion engine, through which the exhaust-gas mass flow AM flows into the particular exhaust-gas channel 22 and then onto the turbine impeller 12. The turbine housing 21 furthermore has an exhaust-gas discharge duct 26, which extends away from the axial end of the turbine impeller 12 in the direction of the turbocharger axis 2 and has an exhaust pipe connection flange 27 for connecting to the exhaust system (not illustrated) of the internal combustion engine. Via this exhaust-gas discharge duct 26, the exhaust-gas mass flow AM emerging from the turbine impeller 12 is discharged into the exhaust system of the internal combustion engine.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A valve flap device for opening and closing a bypass valve of a turbocharger, the valve flap device comprising:
    a valve spindle for rotatable mounting of the valve flap device in a housing of the turbocharger;
    a flap support arranged on the valve spindle, the flap support having a support upper side, a support lower side, and a through aperture, the through aperture extends through the flap support from the support lower side to the support upper side and has a central axis;
    a cover disk having an outer circumference and a central through aperture, the cover disk arranged on the support upper side concentrically with the through aperture of the flap support; and
    a valve flap arranged on the support lower side of the flap support, the valve flap comprising:
        a flap plate; and
        a flap support pin located on a flap plate rear side facing the flap support, wherein the flap support pin is passed from the support lower side through the through aperture of the flap support and through the central aperture of the cover disk and is firmly connected to the cover disk;
    a spring gap provided between the support upper side and the cover disk;
    a spring element installed in the spring gap under a preload in an axial direction of the central axis of the through aperture of the flap support and extends radially at least as far as the outer circumference of the cover disk; and a centering device providing a radial stop integrally formed as part of the centering device on the support upper side, the centering device arranged concentrically with the central axis of the through aperture of the flap support and outside the outer circumference of the cover disk and the spring element installed in the spring gap;

wherein the radial stop maintains the spring element in a centered position relative to the central axis of the through aperture of the flap support.

2. The valve flap device of claim 1, wherein the spring element projects beyond the outer circumference of the cover disk at least in some region or regions.

3. The valve flap device of claim 1, wherein the centering device is formed by a web having an inner edge, wherein the inner edge is raised relative to the surface of the support upper side, and is formed so as to run concentrically around the central axis, at least over partial sections of the circumference, providing the radial stop.

4. The valve flap device of claim 3, wherein the centering device further comprising at least one recess gap, which extends over a partial section of the circumference of the web, allowing a view of the spring element.

5. The valve flap device of claim 1, wherein the centering device is formed by a depression in the surface of the support upper side, providing an inner edge;

wherein the inner edge is formed so as to run concentrically around the central axis of the through aperture of the flap support, at least over partial sections of the circumference, providing the radial stop.

6. The valve flap device of claim 5, wherein the centering device further comprises at least one recess gap, which extends over a partial section of the circumference of the depression, allowing a view of and the spring element.

7. The valve flap device of claim 1, wherein the centering device is formed by a plurality of individual centering pins;

wherein each of the plurality of individual centering pins are arranged in a manner distributed along a circle circumference and are raised relative to the surface of the support upper side, and the circle circumference is arranged concentrically with the central axis of the through aperture of the flap support, providing the radial stop.

8. The valve flap device of claim 1, wherein the spring element comprises a Belleville spring;

wherein a region of an outer edge of the Belleville spring rests on the support upper side and against the radial stop of the centering device.

9. A turbocharger for an internal combustion engine, the turbocharger comprising:

an exhaust-gas turbine;

a radial compressor; and a valve flap device of claim 1 is used in a bypass valve as part of one of the exhaust-gas turbine or the radial compressor.

* * * * *